US009587656B2

(12) United States Patent
Ueda et al.

(10) Patent No.: US 9,587,656 B2
(45) Date of Patent: Mar. 7, 2017

(54) BOOM DRIVING APPARATUS FOR CONSTRUCTION MACHINE

(71) Applicant: KOBELCO CONSTRUCTION MACHINERY CO., LTD., Hiroshima-shi (JP)

(72) Inventors: Koji Ueda, Hiroshima (JP); Kazuharu Tajima, Hiroshima (JP)

(73) Assignee: KOBELCO CONSTRUCTION MACHINERY CO., LTD., Hiroshima-shi (JP)

( * ) Notice: Subject to any disclaimer, the term of this patent is extended or adjusted under 35 U.S.C. 154(b) by 300 days.

(21) Appl. No.: 14/399,062

(22) PCT Filed: Apr. 11, 2013

(86) PCT No.: PCT/JP2013/002468

§ 371 (c)(1),
(2) Date: Nov. 5, 2014

(87) PCT Pub. No.: WO2013/175699

PCT Pub. Date: Nov. 28, 2013

(65) Prior Publication Data

US 2015/0107234 A1 Apr. 23, 2015

(30) Foreign Application Priority Data

May 24, 2012 (JP) ................................ 2012-118747

(51) Int. Cl.
*F16D 31/02* (2006.01)
*F15B 15/18* (2006.01)
(Continued)

(52) U.S. Cl.
CPC .............. *F15B 15/18* (2013.01); *E02F 3/435* (2013.01); *E02F 9/2235* (2013.01);
(Continued)

(58) Field of Classification Search
CPC ... F15B 11/042; F15B 11/0423; F15B 11/165; F15B 11/167; F15B 21/08; F15B 21/14
See application file for complete search history.

(56) References Cited

U.S. PATENT DOCUMENTS 9,394,666 B2 * 7/2016 Oka ...................... E02F 9/2203
2004/0216455 A1 11/2004 Harnischfeger
(Continued)

FOREIGN PATENT DOCUMENTS

CN 1573126 A 2/2005
EP 1 541 872 A1 6/2005
(Continued)

OTHER PUBLICATIONS

Extended European Search Report issued Jul. 14, 2015 in Patent Application No. 13793456.8.
(Continued)

*Primary Examiner* — Michael Leslie
(74) *Attorney, Agent, or Firm* — Oblon, McClelland, Maier & Neustadt, L.L.P.

(57) ABSTRACT

Provided is an apparatus for driving a boom of a construction machine, allowing required power to be reduced. The apparatus includes a boom cylinder, a variable-displacement hydraulic pump , a control valve guiding hydraulic oil discharged by the hydraulic pump to the boom cylinder, a boom-raising-operation detector boom-cylinder pressure detectors, a supply selector valve switchable between a permitting position for permitting the hydraulic oil to be supplied from the hydraulic pump a head-side chamber of the boom cylinder and a blocking position for blocking the supply, a supply oil passage permitting hydraulic oil to be supplied to the head-side chamber during the blocking, and a controller which brings the supply selector valve into the blocking position and reduces volume of the hydraulic pump upon judging that excavation reaction force extends the
(Continued)

boom cylinder even with no supply of hydraulic oil from the hydraulic pump to the head-side chamber.

5 Claims, 5 Drawing Sheets

(51) Int. Cl.

| | |
|---|---|
| ***F15B 11/16*** | (2006.01) |
| ***F15B 21/08*** | (2006.01) |
| ***E02F 3/43*** | (2006.01) |
| ***E02F 9/22*** | (2006.01) |
| ***F15B 11/20*** | (2006.01) |

(52) U.S. Cl.
CPC .......... *E02F 9/2285* (2013.01); *E02F 9/2296* (2013.01); *F15B 11/167* (2013.01); *F15B 11/20* (2013.01); *F15B 21/08* (2013.01); *F15B 2211/411* (2013.01); *F15B 2211/41509* (2013.01); *F15B 2211/426* (2013.01); *F15B 2211/45* (2013.01); *F15B 2211/6313* (2013.01); *F15B 2211/6316* (2013.01); *F15B 2211/6346* (2013.01); *F15B 2211/665* (2013.01); *F15B 2211/6652* (2013.01); *F15B 2211/71* (2013.01); *F15B 2211/7107* (2013.01); *F15B 2211/782* (2013.01)

(56) References Cited

U.S. PATENT DOCUMENTS

| | | | |
|---|---|---|---|
| 2004/0231326 | A1 | 11/2004 | Imanishi et al. |
| 2005/0144938 | A1 | 7/2005 | Kajita et al. |
| 2013/0330160 | A1 | 12/2013 | Oka |

FOREIGN PATENT DOCUMENTS

| | | |
|---|---|---|
| EP | 1 662 151 A1 | 5/2006 |
| JP | 2010-190261 | 9/2010 |
| JP | 2011-017135 | 1/2011 |
| JP | 2012-172491 | 9/2012 |
| WO | 2004/005727 | 1/2004 |

OTHER PUBLICATIONS

International Search Report issued Jul. 16, 2013 in PCT/JP13/002468 filed on Apr. 11, 2013.

* cited by examiner

BOOM DRIVING APPARATUS FOR CONSTRUCTION MACHINE

TECHNICAL FIELD

The present invention relates to an apparatus provided in a construction machine such as a hydraulic excavator including a working attachment having a boom and an arm, to hydraulically drive the boom.

BACKGROUND ART

A general hydraulic excavator includes a base machine and a working attachment attached to the base machine, the working attachment having a boom capable of being raised and lowered, an arm pivotably coupled to a tip of the boom, a bucket attached to a tip of the arm, a boom cylinder for raising and lowering the boom, an arm cylinder for pivoting the arm, and a bucket cylinder for pivoting the bucket. The boom cylinder is interposed between the boom and the base machine so as to raise the boom when extending, and the arm cylinder is interposed between the arm and the boom so as to pivot the arm in a crowding direction (the direction in which the arm approaches the boom) when extending.

In the base machine, there is installed a hydraulic circuit to extend and contract each of the cylinders. The hydraulic circuit includes a hydraulic pump which sucks hydraulic oil stored in a tank and discharges it, and a plurality of control valves interposed between the hydraulic pump and respective cylinders to switch a direction in which the hydraulic oil is fed from the hydraulic pump to the cylinder. Extending and contracting operations of the cylinders are performed by respective operations of the control valves.

Such a hydraulic excavator implements various types of work such as excavation by respective movements of the boom, the arm, and the bucket. For example, Patent Literature 1 indicates that desired excavating work is performed by use of a combined operation of a boom raising operation which is an operation of the boom in the raising direction and an arm crowding operation which is an operation of the arm in the crowding direction.

Conventional construction machines illustrated by the above hydraulic excavator require considerable power, for example, considerable engine horsepower, for rotating the hydraulic pump to extend and contract each cylinder, and reducing the required power is an important challenge. In particular, such excavating work as involves simultaneous execution of the boom raising operation and the arm crowding operation requires considerable horsepower for simultaneous extensions of both of the boom cylinder and the arm cylinder, and reducing the required horsepower is sought.

As means for preventing a vehicle body from being raised by an excavation reaction force during the combined operation, Patent Literature 1 discloses a technique of providing a supply oil passage bringing a rod-side chamber of the boom cylinder and a head-side chamber of the arm cylinder into communication with each other and a selector valve adapted to open and close the supply oil passage, wherein the selector valve is opened to permit hydraulic oil to flow from the head-side chamber of the arm cylinder into the head-side chamber of the boom cylinder only when the rod-side chamber of the boom cylinder rises to a given height or higher, thus automatically extending the boom cylinder; however, the technique is hardly effective in reducing the required power as described above.

CITATION LIST

Patent Literature

Patent Literature 1: WO2004/005727

SUMMARY OF INVENTION

An object of the present invention is to provide an apparatus provided in a construction machine including a working attachment with a boom and an arm, to hydraulically drive the boom, the apparatus being capable of effectively reducing power required for excavating work based on a combined operation including a boom raising operation.

To accomplish the object, the inventors have noted that there can be a case where the excavation reaction force which a working attachment receives from the ground during excavating work acts as a force which extends a boom cylinder for raising a boom (that is, which moves the boom cylinder in a boom raising direction) to thus enable the boom cylinder to be extended in spite of no supply of hydraulic oil thereto. Specifically, during a combined operation including the boom raising operation, for example, during excavating work involving the boom raising operation and an arm crowding operation, there occurs such an excavation reaction force as raises a front end of the base machine from the ground as also shown in FIG. 7 of Patent Literature 1; meanwhile, the gravity acting on the base machine and the like serves to keep the base machine in contact with the ground against the excavation reaction force. This can cause a phenomenon where the boom cylinder is extended in advance of supply of hydraulic oil by a hydraulic pump to a head-side chamber of the boom cylinder. In such a state, the boom cylinder can be naturally extended to suck hydraulic oil into the head-side chamber even with no active forced-supply of the hydraulic oil by the hydraulic pump into the head-side chamber. This state, therefore, permits the active supply of hydraulic oil by the hydraulic pump to the head-side chamber of the boom cylinder to be halted, thereby allowing required power for actuating the hydraulic pump to be effectively reduced.

The present invention has been developed with the above circumstances in view, thus providing an apparatus including the following configuration. Provided by the present invention is an apparatus provided in a construction machine including a base machine and a working attachment, the attachment having a boom attached to the base machine so as to be able to be raised and lowered and an arm pivotably coupled to a tip of the boom, to hydraulically drive the boom, the apparatus comprising: a boom cylinder interposed between the base machine and the boom and connected to the boom and to the base machine so as to actuate the boom in a raising direction with an extension of the boom cylinder; a variable-displacement hydraulic pump which sucks hydraulic oil stored in a tank and discharges the hydraulic oil; a boom control valve switchable between a position for leading hydraulic oil discharged by the hydraulic pump to a head-side chamber of the boom cylinder to extend the boom cylinder and a position for leading hydraulic oil discharged by the hydraulic pump to a rod-side chamber of the boom cylinder to contract the boom cylinder; a boom-raising-operation detector which detects that a boom raising operation for actuating the boom in the raising direction is being applied to the boom control valve; a boom-cylinder pressure detector which detects a pressure in at least the rod-side chamber of the boom cylinder out of the head-side chamber and the rod-side chamber of the boom cylinder; a supply selector valve switchable between a permission position for permitting hydraulic oil to be supplied from the hydraulic pump to the head-side chamber of the boom cylinder and a blocking position for blocking the supply of hydraulic oil from the hydraulic pump to the head-side chamber; a supply oil passage which brings the tank and the head-side chamber of the boom cylinder into communication with each other so as to permit hydraulic oil to be supplied from the tank to the head-side chamber when the supply selector valve blocks the supply of the hydraulic oil; and a controller which brings the supply selector valve into the blocking position and makes volume of the hydraulic pump smaller than volume of the hydraulic pump when the supply selector valve is placed in the permitting position, only in the case where the boom-raising-operation detector detects the boom raising operation and the pressure detected by the boom-cylinder pressure detector satisfies an extension permission condition which is preset up to judge a state where an excavation reaction force exerted on the working attachment is being sufficient to extend the boom cylinder even with no supply of the hydraulic oil from the hydraulic pump to the head-side chamber of the boom cylinder.

DESCRIPTION OF EMBODIMENT

There will be described a preferred embodiment of the present invention with reference to FIGS. 1 to 5.

Figure 2:
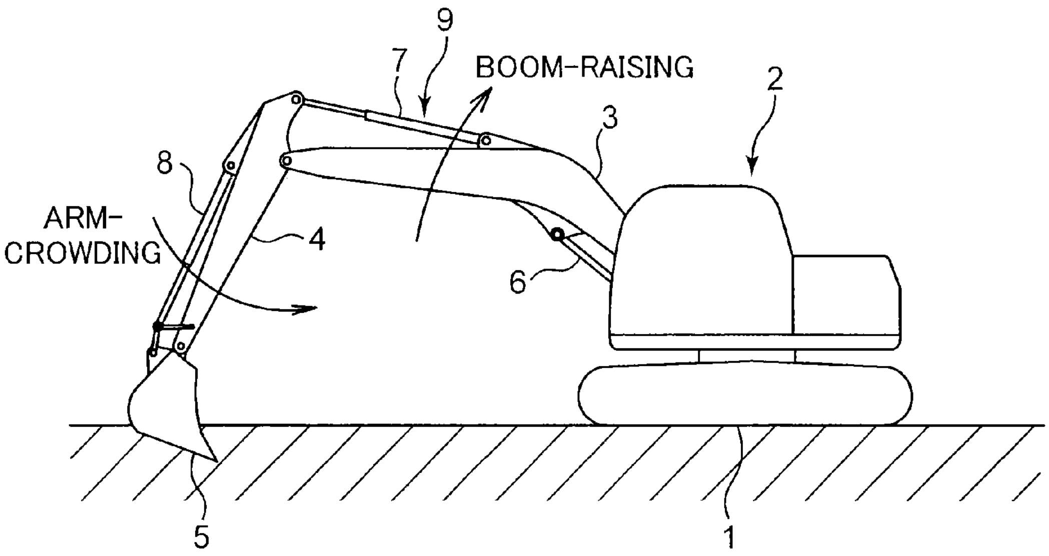
FIG. 2 is a front view showing an example of a hydraulic excavator provided with the hydraulic driving apparatus.

FIG. 2 shows an example of a hydraulic excavator provided with a driving apparatus according to the present invention. The hydraulic excavator includes: a base machine having a lower traveling body 1 and an upper slewing body 2 mounted on the lower traveling body 1; and a working attachment 9 attached to the upper slewing body 2 of the base machine. The working attachment 9 has a boom 3 attached to the upper slewing body 2 so as to be able to be raised and lowered, an arm 4 pivotably coupled to a distal end of the boom 3, and an excavation bucket 5 pivotably mounted to a distal portion of the arm 4.

The hydraulic excavator is provided with the driving apparatus for hydraulically actuating the working attachment 9 including the boom 3. The apparatus includes a boom cylinder 6, an arm cylinder 7, and a bucket cylinder 8 all of which are shown in FIG. 2, and a hydraulic circuit shown in FIG. 1.

The boom cylinder 6 is interposed between the upper slewing body 2 and the boom 3 and configured to be extended and contracted by supply of hydraulic pressure, being pivotably coupled to the boom 3 and to the upper slewing body 2 so as to actuate the boom 3 in a raising direction shown in FIG. 2 by the extension thereof and actuate the boom 3 in a lowering direction by the contraction thereof. Similarly, the arm cylinder 7 is interposed between the boom 3 and the arm 4 and configured to be extended and contracted by supply of hydraulic pressure, being pivotably coupled to the arm 4 and to the boom 3 so as to pivot the arm 4 in a crowding direction shown in FIG. 2 (a direction in which the arm 4 approaches the boom 3) by the extension thereof and pivot the arm 4 in a pushing direction (a direction in which the arm 4 moves away from the boom 3) by the contraction thereof. The bucket cylinder 8 is interposed between the arm 4 and the bucket 5 and configured to be extended and contracted by supply of hydraulic pressure, being pivotably coupled to the bucket 5 and to the arm 4 so as to pivot the bucket 5 in a dipping direction (counterclockwise in FIG. 2) by the extension thereof and pivot the bucket 5 in an opening direction (clockwise in FIG. 2) by the contraction thereof.

Each of the cylinders 6 to 8 includes a cylinder main body, a piston inserted in the cylinder main body, and a rod extending in one direction from the piston. The piston partitions the internal space of the cylinder main body into a rod-side chamber and a head-side chamber opposite to the rod-side chamber. What corresponds to a target to be driven by the driving apparatus according to the present invention out of the cylinders 6 to 8 is the boom cylinder 6; explanation of elements for driving the bucket cylinder 8 is omitted in the following description.

Figure 1:
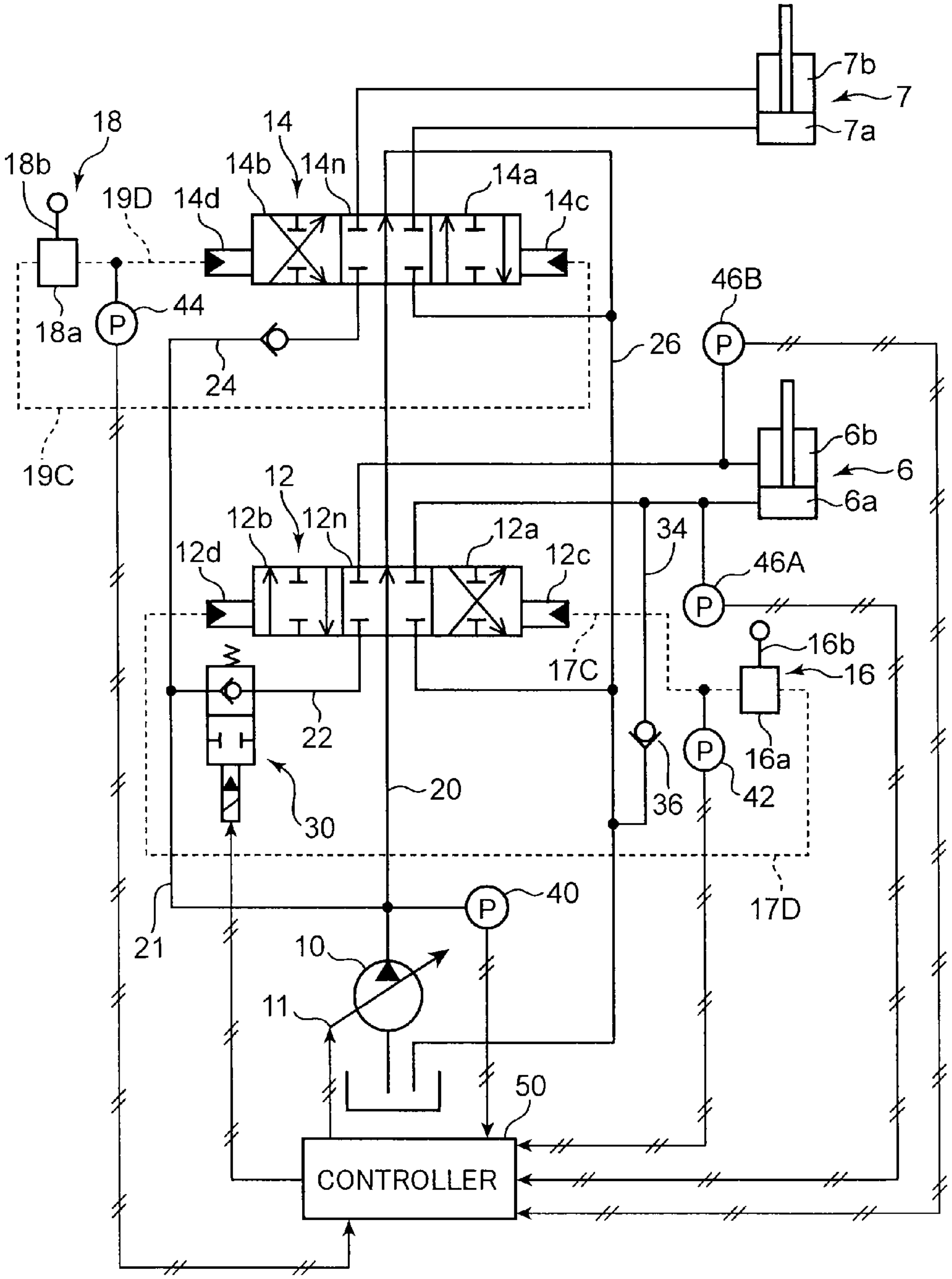
FIG. 1 is a circuit diagram showing a hydraulic driving apparatus according to an embodiment of the present invention.

The hydraulic circuit shown in FIG. 1 includes, as means for moving the boom cylinder 6 and the arm cylinder 7, a hydraulic pump 10, a boom control valve 12 and an arm control valve 14 connected to the hydraulic pump 10, a boom operation device 16, and an arm operation device 18.

The hydraulic pump 10 is configured to suck hydraulic oil stored in a tank and discharge it, comprising a variable-displacement hydraulic pump whose volume is adjustable. Specifically, the hydraulic pump 10 is accompanied with a regulator 11, which is operated to change the volume of the hydraulic pump 10 upon receiving an input of a volume control signal described below.

The hydraulic pump 10 has a discharge port, which is allowed to be in communication with the tank through a center bypass line 20 and a tank line 26 connected to the center bypass line 20. The boom and arm control valves 12 and 14 are provided on the center bypass line 20. Besides the center bypass line 20, the circuit further includes a parallel line for supplying hydraulic oil discharged by the hydraulic pump 10 to the control valves 12 and 14 in parallel with each other. The parallel line has a common oil passage 21 branching off the center bypass line 20 and branch oil passages 22 and 24 further branching off the common oil passage 21 and reaching the control valves 12 and 14.

The hydraulic pump 10 is not necessarily one to drive both the boom cylinder 6 and the arm cylinder 7. Specifically, the present invention also permits the boom cylinder and the arm cylinder to be driven by respective different hydraulic pumps.

Each of the control valves 12 and 14 according to the embodiment comprises a three-position hydraulic-pilot-controlled selector valve. Specifically, the boom control valve 12 has a pair of pilot ports 12*c* and 12*d* and is configured: to be held in a neutral position 12*n* when no pilot pressure is input to the pilot port 12*c* or 12*d*; to be switched to a boom raising position 12*a* when the pilot pressure is input to the pilot port 12*c*; and to be switched to a boom-lowering position 12*b* when the pilot pressure is input to the pilot port 12*d*. Similarly, the arm control valve 14 has a pair of pilot ports 14*c* and 14*d* and is configured: to be held in a neutral position 14*n* when no pilot pressure is input to the pilot port 14*c* or 14*d*; to be switched to an arm-crowding position 14*a* when the pilot pressure is input to the pilot port 14*c*; and to be switched to an arm-pushing position 14*b* when the pilot pressure is input to the pilot port 14*d*.

At the neutral position 12*n*, the boom control valve 12 opens the center bypass line 20, while blocking the boom cylinder 6 from the hydraulic pump 10 and the tank. At the boom-raising position 12*a*, the boom control valve 12 opens a supply-side oil passage for introducing hydraulic oil supplied from the hydraulic pump 10 through the branch oil passage 22 into the head-side chamber 6*a* of the boom cylinder 6, while also opening a return-side oil passage for bringing the rod-side chamber 6*b* of the boom cylinder 6 into communication with the tank through the tank line 26, so as to move the boom cylinder 6 in an extension direction. In contrast, at the boom-lowering position 12*b*, the boom control valve 12 opens a supply-side oil passage for introducing hydraulic oil supplied from the hydraulic pump 10 through the branch oil passage 22 into the rod-side chamber 6*b* of the boom cylinder 6, while also opening a return-side oil passage for bringing the rod-side chamber 6*b* of the boom cylinder 6 into communication with the tank through the tank line 26, so as to move the boom cylinder 6 in the contraction direction. The boom control valve has respective strokes from the neutral position 12*n* to the boom-raising position 12*a* and the boom-lowering position 12*b*, each of which strokes is increased consistently with the increase in the magnitude of the input pilot pressure. The increase in the stroke involves increase in respective opening areas of the supply-side oil passage and the return-side oil passage.

Similarly, at the neutral position 14*n*, the arm control valve 14 opens the center bypass line 20, while blocking the arm cylinder 7 from the hydraulic pump 10 and the tank. At the arm-crowding position 14*a*, the arm control valve 14 opens a supply-side oil passage for introducing hydraulic oil supplied from the hydraulic pump 10 through the branch oil passage 24 into the head-side chamber 7*a* of the arm cylinder 7, while also forming a return-side oil passage for bringing the rod-side chamber 7*b* of the arm cylinder 7 into communication with the tank through the tank line 26, so as to move the arm cylinder 7 in an extension direction. In contrast, at the arm-pushing position 14*b*, the arm control valve 14 forms a supply-side oil passage for introducing hydraulic oil supplied from the hydraulic pump 10 through the branch oil passage 24 into the rod-side chamber 7*b* of the arm cylinder 7, while also opening a return-side oil passage for bringing the rod-side chamber 7*b* of the arm cylinder 7 into communication with the tank through the tank line 26 so as to move the arm cylinder 7 in the contraction direction. The arm control valve 14 has respective strokes from the neutral position 14*n* to the arm-crowding position 14*a* and the arm-pushing position 14*b*, each of which strokes is increased consistently with the increase in the magnitude of the input pilot pressure. The increase of the stroke involves respective opening areas of the supply-side oil passage and the return-side oil passage.

The boom operation device 16, which is used by an operator to operate the boom cylinder 6, has a not-graphically-shown pilot hydraulic source, a boom remote control valve 16*a*, and a boom operation lever 16*b*. The boom operation lever 16*b* is an operation member to which a rotational manipulation is applied by the operator, rotatably connected to the boom remote control valve 16*a*. The boom operation lever 16*b* is able to be manipulated, by the operator, to either of opposite sides across the neutral position, namely, boom-raising side and the boom-lowering side. The boom remote control valve 16*a* supplies a pilot pressure generated by the pilot pressure source to the boom control valve 12 in accordance with the manipulation position of the boom operation lever 16*b*. Specifically, when the boom operation lever 16*b* is in the neutral position, the boom remote control valve 16*a* supplies no pilot pressure. When the boom operation lever 16*b* is manipulated to the boom-raising side, the boom remote control valve 16*a* supplies a pilot pressure of a magnitude corresponding to the amount of the manipulation to the pilot port 12*c* of the boom control valve 12 through a pilot line 17C. When the boom operation lever 16*b* is manipulated to the boom-lowering side, the boom remote control valve 16*a* supplies a pilot pressure of a magnitude corresponding to the amount of the manipulation to the pilot port 12*d* of the boom control valve 12 through a pilot line 17D.

Similarly, the arm operation device 18, which is used by the operator to operate the arm cylinder 7, has a not-graphically-shown pilot hydraulic source, an arm remote control valve 18*a*, and an arm operation lever 18*b*. The arm operation lever 18*b* is an operation member to which a rotational manipulation is applied by the operator, rotatably connected to the arm remote control valve 18*a*. The arm operation lever 18*b* is able to be manipulated, by the operator, to either of opposite sides across the neutral position, namely, the arm-crowding side and the arm-pushing side. The arm remote control valve 18*a* supplies a pilot pressure generated by the pilot pressure source to the arm control valve 14 in accordance with the manipulation position of the arm operation lever 18*b*. Specifically, when the arm operation lever 18*b* is in the neutral position, the arm remote control valve 18*a* supplies no pilot pressure. When the arm operation lever 18*b* is manipulated to the arm-crowding side, the arm remote control valve 18*a* supplies a pilot pressure of a magnitude corresponding to the amount of the manipulation to the pilot port 14*c* of the arm control valve 14 through a pilot line 19C. When the arm operation lever 18*b* is manipulated to the arm-pushing side, the arm remote control valve 18*a* supplies a pilot pressure of a magnitude corresponding to the amount of the manipulation to the pilot port 14*d* of the arm control valve 14 through a pilot line 19D.

The apparatus, as a feature thereof, further includes a supply selector valve 30 provided in the branch oil passage 22 which is a supply oil passage to the boom cylinder 6. The supply selector valve 30 according to the embodiment includes a two-position solenoid-hydraulic-pilot-controlled selector valve including a solenoid 32. When the solenoid 32 receives no input of switching instruction signal, the supply selector valve 30 is held in an open position, that is, a position for opening the branch oil passage 22 to permit only a flow of hydraulic oil in a supply direction (an upper-side position in FIG. 1). When the switching instruction signal is input to the solenoid 32, the supply selector valve 30 is switched, by a pilot pressure introduced in association with the input, to a blocking position, that is, a position (a lower-side position in FIG. 1) for blocking the branch oil passage 22 to inhibit hydraulic oil from being fed through the branch oil passage 22. The supply selector valve 30 may be a simple pilot selector valve. This case is permitted by separately providing a solenoid selector valve for switching the pilot pressure to be input to the pilot pressure selector valve.

Furthermore, the apparatus includes a supply oil passage 34 which allows the hydraulic oil in the tank to be sucked into, that is, supplied to, the head-side chamber 6*a* of the boom cylinder 6 accompanying the extension of the boom cylinder when the supply of the hydraulic oil is blocked by the supply selector valve 30. The supply oil passage 34 according to the embodiment is provided so as to bring the head-side chamber 6*a* and the tank line 26 into communication with each other, and is provided with a check valve 36 in the middle of the supply oil passage 34 which inhibits a flow of hydraulic oil from the head-side chamber 6*a* to the tank line 26 (that is, backflow). The check valve 36 may be dedicated to the supply oil passage 34 or built into a relief valve with a check valve forming a port relief valve provided for the head-side chamber 6*a*. In other words, the supply oil passage 34 may be formed by direct utilization of a relief channel provided for the head-side chamber 6*a*.

Moreover, in addition to the components described above, the apparatus includes, as means for controlling the switching of the supply selector valve 30 and the volume of the hydraulic pump 10, a plurality of pressure sensors provided in the circuit and a controller 50 which performs control operations in response to inputs of respective detection signals generated by the pressure sensors.

The pressure sensors include a pump pressure sensor 40 which detects a pump pressure Pp, which is the discharge pressure of the hydraulic pump 10, a boom-raising pilot pressure sensor 42 which detects a pilot pressure corresponding to a boom-raising operation signal, that is, a pilot pressure output to the pilot line 17C by the boom operation device 16, an arm-crowding pilot pressure sensor 44 which detects a pilot pressure corresponding to an arm crowding operation signal, that is, a pilot pressure output to the pilot line 19C by the arm operation device 18, and a boom-cylinder head pressure sensor 46A and a boom-cylinder rod pressure sensor 46B which detect a head pressure Ph, which is the pressure in the head-side chamber 6*a* of the boom cylinder 6, and a rod pressure Pr, which is the pressure in the rod-side chamber 6*b* of the boom cylinder 6, respectively. Out of these pressure sensors, the boom-raising pilot pressure sensor 42, the arm-crowding pilot pressure sensor 44, and the head and rod pressure sensors 46A and 46B correspond to a boom-raising detector, an arm-crowding detector, and a boom-cylinder pressure detector of the present invention, respectively.

Figure 3:
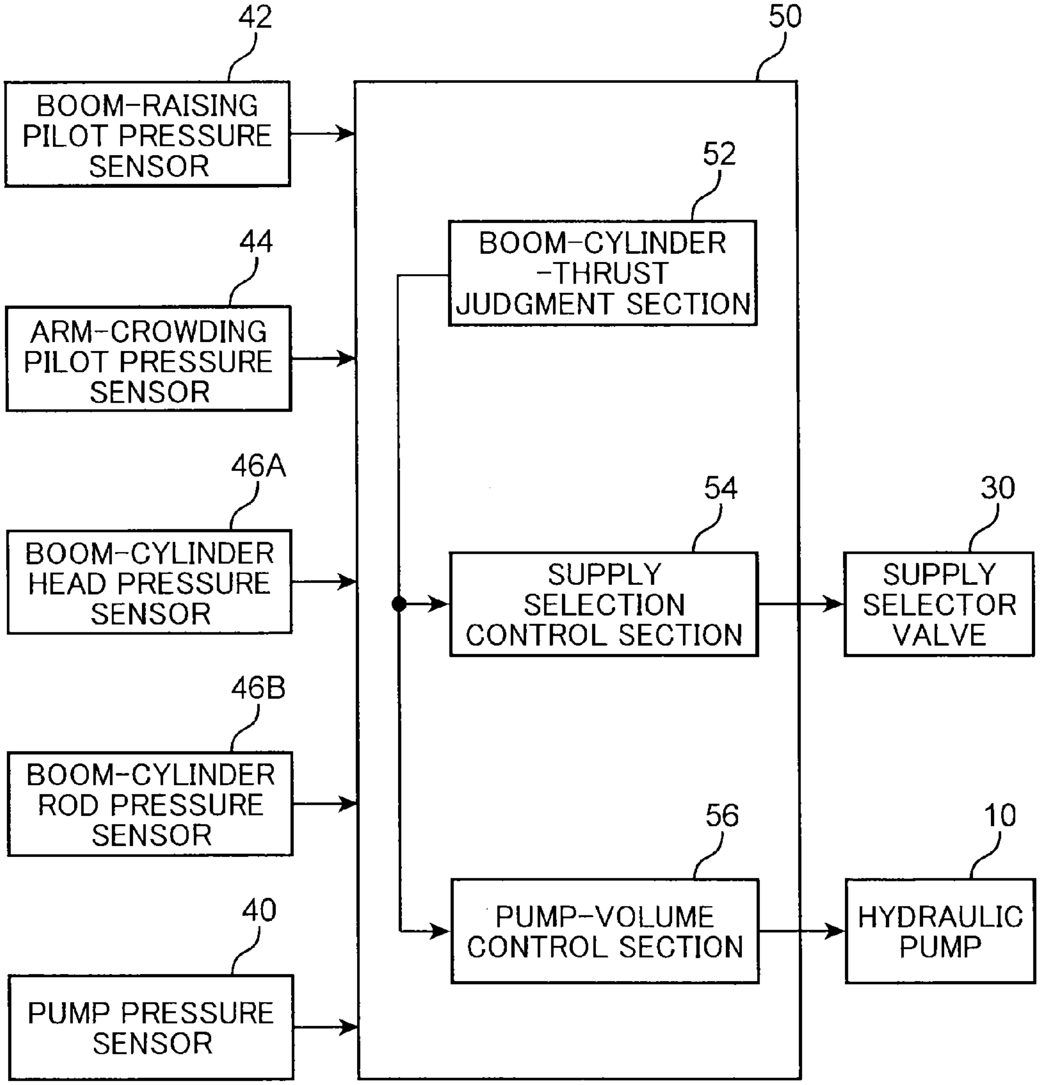
FIG. 3 is a block diagram showing a functional configuration of a controller in the hydraulic driving apparatus and input and output signals with respect to the controller.
Figure 4:
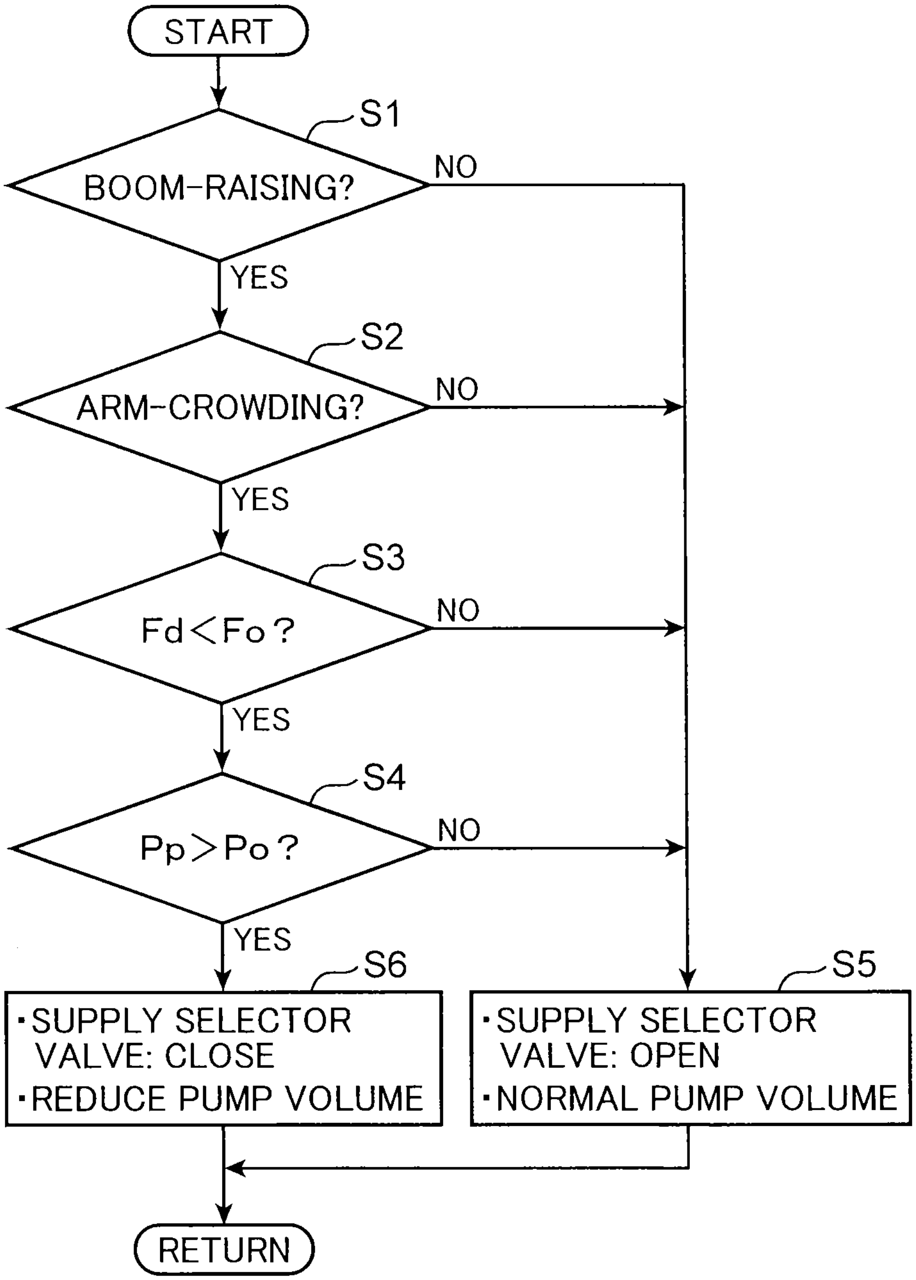
FIG. 4 is a flowchart showing arithmetic control operations performed by the controller.

The controller 50 is formed of a computer and the like, including a boom-cylinder-thrust judgment section 52, a supply selection control section 54, and a pump-volume control section 56 as shown in FIG. 3.

The boom-cylinder-thrust judgment section 52 calculates a thrust Fd by which the pressure of the hydraulic oil supplied to the head-side chamber 6*a* extends the boom, based on the head pressure Ph and the rod pressure Pr detected by the boom-cylinder head pressure sensor 46A and the boom-cylinder rod pressure sensor 46B, respectively, and judges whether or not the thrust is lower than a preset thrust threshold Fo. This judgment corresponds to a judgment whether or not the boom cylinder 6 is extended by an excavation reaction force as described below in advance of the supply of the hydraulic oil to the head-side chamber 6*a*. Thus, in this embodiment, the condition that the thrust Fd of the boom cylinder 6 is lower than the thrust threshold Fo (Fd<Fo) is set to an extension-permission condition according to the invention, that is, a condition for judgment that the excavation reaction force is sufficient to extend the boom cylinder 6 even with no supply of the hydraulic oil from the hydraulic pump 10 to the head-side chamber 6*a* of the boom cylinder 6.

The thrust Fd is calculated based on Formula (1).

$$Fd=Fh-Fr=Ph\times Ah-Pr\times Ar \tag{1}$$

In Formula (1), Fh and Fr denote respective forces exerted on the piston in the boom cylinder 6 by the head-side chamber 6*a* and the rod-side chamber 6*b*, and Ah and Ar denote respective pressure receiving areas of the piston in the head-side chamber 6*a* and in the rod-side chamber 6*b*.

The thrust threshold Fo, while being permitted to be appropriately set, is preferably Fo≅0, that is, the thrust threshold Fo is 0 or close to 0, considering that Ff<Fo is the extension permission condition. Alternatively, it is also permitted to set Fo to a negative value sufficiently apart from 0 for more discretely judging that the boom cylinder 6 is being in the natural extension state.

The supply selection control section 54, in the embodiment, outputs a selection instruction signal to the supply selector valve 30 to bring the supply selector valve 30 into the blocking position (step S6 in a flowchart shown in FIG. 4) only when all of the following conditions A to D are satisfied (YES in each of steps S1 to S4 in the flowchart); otherwise (NO in any of steps S1 to S4), the supply selection control section 54 stops output of the selection instruction signal to hold the supply selector valve 30 in the open position (step S5 in the flowchart).

Condition A: The boom operation device 16 is being manipulated in the boom raising direction. In other words, the pilot pressure (the pressure in the pilot line 17C) corresponding to the boom-raising operation signal has been raised (YES in step S1).

Condition B: The arm operation device 18 is being manipulated in the arm crowding direction. In other words, the pilot pressure (the pressure in the pilot line 19C) corresponding to the arm crowding operation signal has been raised (YES in step S2).

Condition C: The boom cylinder thrust Fd is lower than the thrust threshold Fo (YES in step S3).

Condition D: The pump pressure Pp detected by the pump pressure sensor 40 is higher than a pump pressure threshold Po (YES in step S4).

The conditions A and B are set up for judgment on whether or not such excavating work as shown in FIG. 2, that is, excavating work by a combined operation involving simultaneous execution of a boom raising operation and an arm crowding operation, is being performed. The condition B may be omitted, but taking condition B into account makes it possible to prevent that the supply of the hydraulic oil to the head-side chamber 6*a* is blocked in a situation where the boom cylinder thrust Fd is lower than the thrust threshold Fo due to a factor other than the excavation action force during the excavating work (for example, in a situation where the head pressure Ph and the rod pressure Pr are significantly varied by rocking of the working attachment 9).

The condition D is set up to inhibit blocking hydraulic oil supply in a situation where the pump pressure Pp is so low that the excavation reaction force can be presumed to fail to be exerted (for example, in a situation where the working attachment 9 is being raised from the ground). The condition D also may be omitted depending on the specification of the apparatus.

Alternatively, although being simplified means which may decrease judgment accuracy, it is also permitted to replace the condition C with a condition that the rod pressure Pr is equal to or higher than a preset pressure threshold, as the extension permission condition.

The pump-volume control section 56 is configured to control the volume of the hydraulic pump 10. In the embodiment, when the supply selector valve 30 is brought into the blocking position (step S6), the pump-volume control section 56 performs a control to reduce the volume of the hydraulic pump 10 by the amount of hydraulic oil unrequired due to the supply blocking, compared to when the supply selector valve 30 is not in the blocking position (step S5). The amount of the volume to be reduced is calculated as follows.

Figure 5:
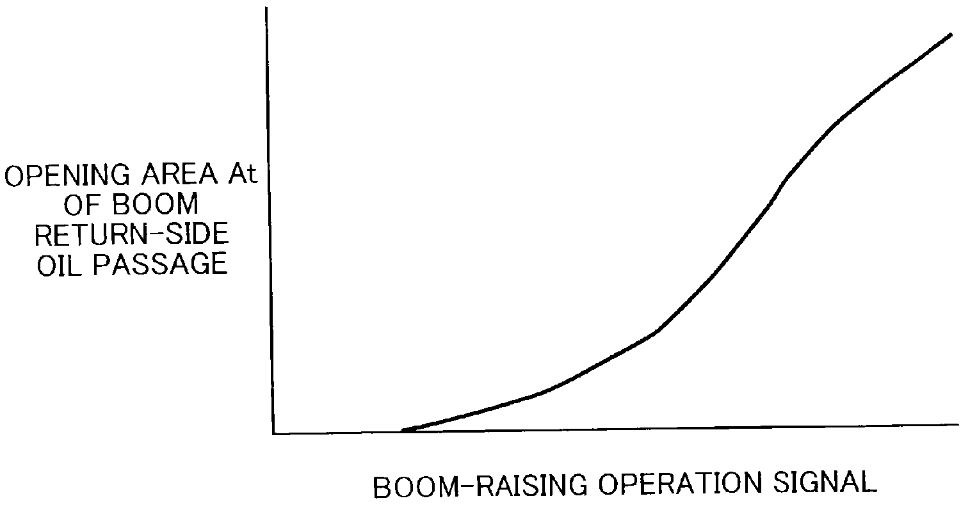
FIG. 5 is a graph showing an example of a relation between a boom-raising operation signal and the opening area of a return-side oil passage for boom in the hydraulic driving apparatus.

1) Based on the boom-raising operation signal, an opening area of the return-side oil passage At is determined; the return-side oil passage is a passage opened by the boom control valve 12 in the boom-raising position 12*a*, that is, a passage from the rod-side chamber 6*b* to the tank. The "opening area At of the return-side oil passage" as referred to herein is the value of the throttle opening area of the return-side oil passage corresponding to the diaphragm flow resistance in the return-side oil passage. As shown in FIG. 5, the characteristic of the opening area At with respect to the boom-raising operation signal depends on the operating characteristic of a direction selector valve which constitutes the boom control valve 12, a pressure loss in each channel, or the like. Accordingly, based on the characteristic of the opening area At, the opening area At can be determined.

2) With regarding the difference between the rod pressure Pr detected by the boom-cylinder rod pressure sensor 46B and the tank pressure as the pressure difference ΔPt between an upstream side and a downstream side of the return-side oil passage, the flow rate Qr of hydraulic oil flowing out from the rod-side chamber 6*b* is calculated based on Formula (2).

$$Qr=Cd\times At\sqrt{(2\Delta Pt/\rho)} \qquad (2)$$

Cd denotes a flow coefficient for the hydraulic oil, and p denotes the density of the hydraulic oil.

3) The flow rate Qh of hydraulic oil flowing into the head-side chamber 6*a* is calculated from the outflow rate Qr of hydraulic oil from the rod-side chamber 6*b*. This calculation can be executed by use of the following Formula (3).

$$Qh=Qr\times[Rh^2/(Rh^2-Rr^2)]\times N \qquad (3)$$

Rh and Rr denote respective inner diameters of the head-side chamber 6*a* and the rod-side chamber 6*b*. N denotes the number of boom cylinders 6. Accordingly, if the hydraulic excavator includes only a single boom cylinder, N=1; if the hydraulic excavator includes a plurality of boom cylinders provided in juxtaposition, N≥2.

4) The inflow rate Qh of hydraulic oil into the head-side chamber 6*a* is converted into the pump volume. Specifically, the pump volume (reduction volume) Vh corresponding to the inflow rate Qh can be obtained by dividing the inflow rate Qh by the number of revolutions Ne of the hydraulic pump 10 (Vh=Qh/Ne).

5) The final volume is set to a value obtained by subtracting the reduction volume Vh from a pump volume (normal pump volume) Vo to be set in the case of no block of the supply of hydraulic oil to the head-side chamber 6*a*, and a volume operation signal is input to the regulator 11 of the hydraulic pump 10 so as to obtain the final volume. The normal pump volume Vo can be determined by use of various conventionally known calculation methods. For example, the normal pump volume Vo can be determined by use of a calculation based on position control involving increasing the pump volume with the increase in the respective amounts of manipulations applied to the boom operation device 16 and the arm operation device 18, a calculation based on horsepower control involving changing the pump volume based on the pump pressure Pp so as to make pump drive horsepower be close to a predefined characteristic, or low-order selection from respective values determined by the above calculations.

While the calculations 1) to 3) involve calculating the flow rate Qr of hydraulic oil actually input to the rod-side chamber 6*b* based on the opening area At of the boom return-side oil passage and converting the flow rate Qr to the flow rate Qh of hydraulic oil flowing into the head-side chamber 6*a*, it may be replaced with a calculation for estimating a virtual flow rate Qh' of hydraulic oil which would flow into the head-side chamber 6*a* when the supply selector valve 30 was opened on the basis of the opening area As of the supply-side oil passage opened by the boom control valve 12 in the boom-raising position 12*a*, that is, the oil passage from the hydraulic pump 10 to the head-side chamber 6*a*. Specifically, instead of the calculations in 1) to 3), the following calculations 1') and 2') may be performed.

Figure 6:
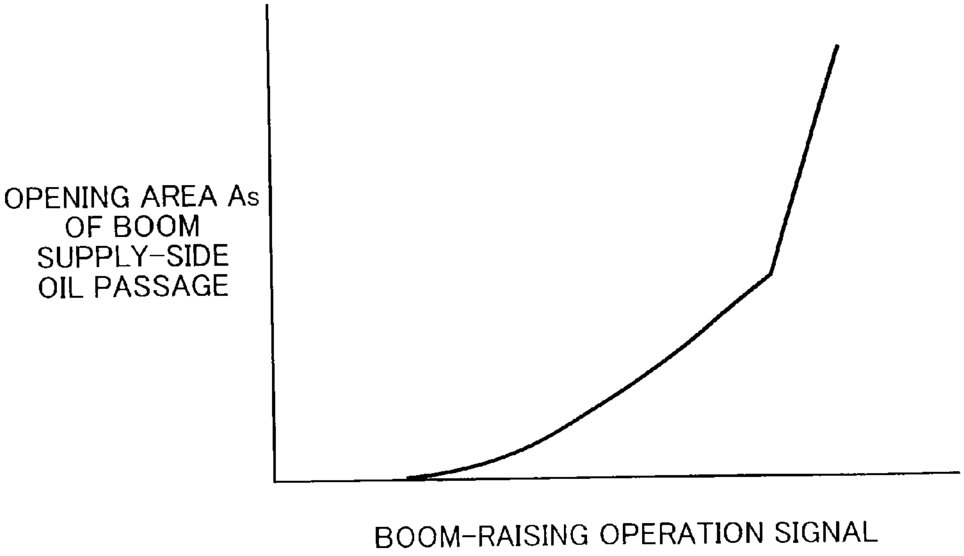
FIG. 6 is a graph showing an example of a relation between the boom-raising operation signal and the opening area of a supply-side oil passage for boom in the hydraulic driving apparatus.

1') Based on the boom-raising operation signal, the opening area As of the supply-side oil passage opened by the boom control valve 12 in the boom-raising position 12*a* is determined. The "opening area As of the supply-side oil passage" as referred to herein is also the value of the opening area of a constricted portion of the supply-side oil passage to which flow resistance in the supply-side oil passage is converted. As shown in FIG. 6, the characteristic of the opening area As with respect to the boom-raising operation signal is also determined by the characteristic of the operation of a direction selector valve constituting the boom control valve 12, a pressure loss in each channel, and the like. The characteristic of the opening area As, therefore, allows the opening area to be determined based thereon.

2') With regarding the difference between the pump pressure Pp detected by the pump pressure sensor 40 and the head pressure Ph detected by the boom-cylinder head pressure sensor 46A as the pressure difference Δ Ps (=Pp−Ph) between an upstream side and a downstream side of the feeing side oil passage, the virtual flow rate Qh' of hydraulic oil which would flow into the head-side chamber 6*a* when the supply selector valve 30 was opened is calculated based on the following Formula (2)'.

$$Qh'=Cd\times As\sqrt{(2\Delta Ps/\rho)} \qquad (2)'$$

The head pressure Ph during the natural extension of the boom cylinder 6 is so low that it can be regarded as 0 to let ΔPs equal to Pp.

Next will be described the specific actions made by the driving apparatus based on the control of the controller 50.

First, if the operation state of the hydraulic excavator fails to satisfy any of conditions A to D (NO in any of steps S1 to S4 in FIG. 4), the supply selection control section 54 of the controller 50 keeps no output of the switching instruction signal to the supply selector valve 30 to hold the supply selector valve 30 in the open position, while the pump-volume control section 56 sets the pump volume Vo for normal operation (step S5). Hence, the hydraulic pump 10 discharges hydraulic oil at a normal flow rate, the discharged oil being directly supplied to the boom control valve 12. On the other hand, if the boom operation device 16 is manipulated, a pilot pressure of a magnitude corresponding to the amount of the manipulation is input to a pilot port which is one of the pilot ports 12*c*, 12*d* of the boom control valve 12 and corresponds to the direction of the operation, thereby operating the boom control valve 12 to guide the hydraulic oil to the head-side chamber 6*a* or rod-side chamber 6*b* of the boom cylinder 6. The supply of hydraulic oil is thus performed in accordance with the manipulation applied to the boom operation device 16. The relationship of the arm cylinder 7 and the arm operation device 18 is alike.

In contrast, if the operation state of the hydraulic excavator satisfies all of conditions A to D (YES in all of steps S1 to S4), the supply selection control section 54 outputs the switching instruction signal to the supply selector valve 30 to bring the supply selector valve 30 into the blocking position, thereby forcedly blocking the supply of hydraulic oil from the hydraulic pump 10 to the head-side chamber 6*a* of the boom cylinder 6; meanwhile, the pump-volume control section 56 makes the pump volume smaller than the normal pump volume Vo by the reduction volume Vh (that is, the pump volume corresponding to the flow rate Qh of hydraulic oil flowing into the head-side chamber 6*a* or the virtual flow rate Qh' of hydraulic oil which would flow into the head-side chamber 6*a*) (step S6).

Such operation state as satisfies the conditions A to D can be caused basically during such excavating work as shown in FIG. 2. Specifically, as shown in FIG. 2, during excavating work involving simultaneous execution of a boom raising operation and an arm crowding operation, an excavation reaction force from the ground is received by the bucket 5 so as to raise a front end of the base machine (that is, in FIG. 2, the lower traveling body 1 and the upper slewing body 2), while the gravity acting on the base machine serves to keep the base machine in contact with the ground against the excavation reaction force, resulting in a force exerted on the boom cylinder 6 in a direction to extend the boom. When the exerted force becomes to have a given magnitude or larger, the boom cylinder 6 is brought into a state of naturally extending in spite of no supply of hydraulic oil from the hydraulic pump 10 to the head-side chamber 6*a*, thus eliminating a requirement of the supply of hydraulic oil.

The conditions A to D are set up to judge whether or not the boom cylinder 6 is in the natural extension state as described above; therefore, the controller 50 can realize the reduction in required power of the hydraulic pump 10 by causing the supply selector valve 30 to block the supply of hydraulic oil when the conditions A to D are satisfied and reducing the volume of the hydraulic pump 10 by an amount equivalent to the flow rate of hydraulic oil which would be supplied from the hydraulic pump 10 to the head-side chamber 6*a* if the above supply was not blocked. Upon this, the boom cylinder 6 can be extended, in spite of no supply of hydraulic oil from the hydraulic pump 10, by suction of the hydraulic oil in the tank into the head-side chamber 6*a* through the supply oil passage 34.

The reduction volume Vh does not absolutely have to be equivalent to the inflow rate of hydraulic oil into the head-side chamber 6*a* but may, for example, be set to a given value.

As described above, the present invention is to provide an apparatus provided in a construction machine including a working attachment with a boom and an arm, to hydraulically drive the boom, the apparatus being capable of effectively reducing power required for excavating work based on a combined operation including a boom raising operation. Provided by the present invention is an apparatus provided in a construction machine including a base machine and a working attachment, the attachment having a boom attached to the base machine so as to be able to be raised and lowered, and an arm pivotably coupled to a tip of the boom, to hydraulically drive the boom, the apparatus comprising: a boom cylinder interposed between the base machine and the boom and connected to the boom and to the base machine so as to actuate the boom in a raising direction with an extension of the boom cylinder; a variable-displacement hydraulic pump which sucks hydraulic oil stored in a tank and discharges the hydraulic oil; a boom control valve switchable between a position for leading hydraulic oil discharged by the hydraulic pump to a head-side chamber of the boom cylinder to extend the boom cylinder and a position for leading hydraulic oil discharged by the hydraulic pump to a rod-side chamber of the boom cylinder to contract the boom cylinder; a boom-raising-operation detector which detects that a boom raising operation for actuating the boom in the raising direction is being applied to the boom control valve; a boom-cylinder pressure detector which detects a pressure in at least the rod-side chamber of the boom cylinder out of the head-side chamber and the rod-side chamber of the boom cylinder; a supply selector valve switchable between a permission position for permitting hydraulic oil to be supplied from the hydraulic pump to the head-side chamber of the boom cylinder and a blocking position for blocking the supply of hydraulic oil from the hydraulic pump to the head-side chamber; a supply oil passage which brings the tank and the head-side chamber of the boom cylinder into communication with each other so as to permit hydraulic oil to be supplied from the tank to the head-side chamber when the supply selector valve blocks the supply of the hydraulic oil; and a controller which brings the supply selector valve into the blocking position and makes volume of the hydraulic pump smaller than volume of the hydraulic pump when the supply selector valve is placed in the permitting position, only in the case where the boom-raising-operation detector detects the boom raising operation and the pressure detected by the boom-cylinder pressure detector satisfies an extension permission condition which is preset up to judge a state where an excavation reaction force exerted on the working attachment is being sufficient to extend the boom cylinder even with no supply of the hydraulic oil from the hydraulic pump to the head-side chamber of the boom cylinder.

According to the apparatus, when an operation on the boom cylinder in the boom raising direction is performed, it is judged, based on the pressure in at least the rod-side chamber of the boom cylinder, whether or not the construction machine is in a state where the excavation reaction force acting on the working attachment is sufficient to extend the boom cylinder even when the hydraulic oil is not supplied from the hydraulic pump to the head-side chamber of the boom cylinder (this is hereinafter referred to as a "natural extension state"), in other words, in a state where the hydraulic oil can be sucked from the tank into the head-side chamber through the supply oil passage. When the boom cylinder is judged to be in the natural extension state, the supply of the hydraulic oil to the head-side chamber is blocked, and the pump volume of the hydraulic pump is reduced. This enables the power of the hydraulic pump to be saved while ensuring normal operations of the working attachment (operations including the boom raising operation).

Specifically, the extension permission condition preferably includes a condition that a cylinder thrust which extends the boom cylinder and is determined based on the pressure in the head-side chamber and the pressure in the rod-side chamber is smaller than a preset thrust threshold. Based on the magnitude of the above-mentioned cylinder thrust, the judgment on the extension state of the boom cylinder (judgment on whether or not the boom cylinder is in the natural extension state) can be adequately performed.

This case involves that the boom-cylinder pressure detector is configured to detect respective pressures in the head-side chamber and the rod-side chamber of the boom cylinder.

Preferably, the apparatus further includes an arm-crowding-operation detector which detects that an arm crowding operation which is an operation of actuating the arm in a crowding direction is being performed, and the controller brings the supply selector valve into the blocking position and causes the volume of the hydraulic pump to be reduced only when the arm crowding operation in addition to the boom raising operation is detected. The supply-block conditions thus including the detection of the arm crowding operation in addition to the detection of the boom raising operation and the satisfaction of the extension permission condition enables the supply of the hydraulic oil to the head-side chamber to be prevented from being blocked in the case where the boom cylinder is extended due to a factor other than the excavation action force during the excavating work involving the boom raising operation and the arm crowding operation, for example, in the case of periodical extension of the boom due to rock of the working attachment.

Moreover, it is preferable that the controller brings the supply selector valve into the blocking position and causes the volume of the hydraulic pump to be reduced only when a discharge pressure of the hydraulic pump exceeds a preset pressure threshold, in addition to the detection of the boom raising operation and the arm crowding operation and the satisfaction of the extension permission condition. Thus taking account of the discharge pressure of the hydraulic pump enables the supply of the hydraulic oil to the head-side chamber to be prevented from being blocked when the boom raising operation and the arm crowding operation are being performed under approximately no load (for example, in a state that the working attachment is being raised from the ground).

The amount by which the controller causes the volume of the hydraulic pump to be reduced when the supply of the hydraulic oil to the head-side chamber is blocked is, preferably, close to the amount of hydraulic oil that need not to be discharged as a result of the supply blocking. Specifically, the controller preferably calculates a flow rate of hydraulic oil flowing into the head-side chamber of the boom cylinder and designates, as an actual volume of the hydraulic pump, a value obtained by subtracting a pump volume corresponding to the flow rate from a pump volume set for a normal operation not including blocking the supply of the hydraulic oil to the head-side chamber.

The invention claimed is:

1. A boom driving apparatus for a construction machine, the apparatus being provided in the construction machine including a base machine and a working attachment, the working attachment having a boom attached to the base machine so as to be able to be raised and lowered and an arm pivotably coupled to a tip of the boom, to hydraulically drive the boom, the apparatus comprising:

a boom cylinder interposed between the base machine and the boom and connected to the boom and to the base machine so as to actuate the boom in a raising direction with an extension of the boom cylinder;

a variable-displacement hydraulic pump which sucks hydraulic oil stored in a tank and discharges the hydraulic oil;

a boom control valve switchable between a position for leading hydraulic oil discharged by the hydraulic pump to a head-side chamber of the boom cylinder to extend the boom cylinder and a position for leading hydraulic oil discharged by the hydraulic pump to a rod-side chamber of the boom cylinder to contract the boom cylinder;

a boom-raising-operation detector which detects that a boom raising operation for actuating the boom in the raising direction is being applied to the boom control valve;

a boom-cylinder pressure detector which detects a pressure in at least the rod-side chamber of the boom cylinder out of the head-side chamber and the rod-side chamber of the boom cylinder;

a supply selector valve switchable between a permission position for permitting hydraulic oil to be supplied from the hydraulic pump to the head-side chamber of the boom cylinder and a blocking position for blocking the supply of hydraulic oil from the hydraulic pump to the head-side chamber;

a supply oil passage which brings the tank and the head-side chamber of the boom cylinder into communication with each other so as to permit hydraulic oil to be supplied from the tank to the head-side chamber when the supply selector valve blocks the supply of the hydraulic oil; and a controller which brings the supply selector valve into the blocking position and makes volume of the hydraulic pump smaller than volume of the hydraulic pump when the supply selector valve is in the permitting position, only in the case where the boom-raising-operation detector detects the boom raising operation and the pressure detected by the boom-cylinder pressure detector satisfies an extension permission condition which is preset up to judge a state where an excavation reaction force exerted on the working attachment is being sufficient to extend the boom cylinder even with no supply of the hydraulic oil from the hydraulic pump to the head-side chamber of the boom cylinder.

2. The boom driving apparatus for a construction machine according to claim 1, wherein the boom-cylinder pressure detector detects the pressure in each of the head-side chamber and rod-side chamber of the boom cylinder, and the extension permission condition includes a condition that a cylinder thrust which extends the boom cylinder and is determined based on the pressure in the head-side chamber and the pressure in the rod-side chamber is smaller than a preset thrust threshold.

3. The boom driving apparatus for a construction machine according to claim 1, further comprising an arm-crowding-operation detector which detects that an arm crowding operation which is an operation of actuating the arm in a crowding direction is being performed, and the controller brings the supply selector valve into the blocking position and causes the volume of the hydraulic pump to be reduced only when the arm crowding operation in addition to the boom raising operation is detected.

4. The boom driving apparatus for a construction machine according to claim 3, wherein the controller brings the supply selector valve into the blocking position and causes the volume of the hydraulic pump to be reduced only when a discharge pressure of the hydraulic pump exceeds a preset pressure threshold, in addition to the detection of the boom raising operation and the arm crowding operation and the satisfaction of the extension permission condition.

5. The boom driving apparatus for a construction machine according to claim 1, wherein the controller calculates a flow rate of hydraulic oil flowing into the head-side chamber of the boom cylinder and designates, as an actual volume of the hydraulic pump, a value obtained by subtracting a pump volume corresponding to the flow rate from a pump volume set for a normal operation not including blocking the supply of the hydraulic oil to the head-side chamber.

* * * * *